(12) United States Patent
Sinnamohideen

(10) Patent No.: US 12,367,101 B1
(45) Date of Patent: Jul. 22, 2025

(54) PROCESSING WRITES WITH STORAGE NODE FAILURE IN A PARALLEL FILE SYSTEM

(71) Applicant: VDURA, Inc., San Jose, CA (US)

(72) Inventor: Shafeeq Sinnamohideen, Pittsburgh, PA (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 18/885,228

(22) Filed: Sep. 13, 2024

(51) Int. Cl.
*G06F 11/00* (2006.01)
*G06F 11/10* (2006.01)
*G06F 16/13* (2019.01)
*G06F 16/18* (2019.01)

(52) U.S. Cl.
CPC .......... *G06F 11/1092* (2013.01); *G06F 16/13* (2019.01); *G06F 16/1858* (2019.01)

(58) Field of Classification Search
CPC ............. G06F 11/2094; G06F 11/1435; G06F 11/1471; G06F 11/1076; G06F 11/1662; G06F 11/1084; G06F 11/1092; G06F 11/2082
See application file for complete search history.

(56) References Cited

U.S. PATENT DOCUMENTS

| | | | | |
|---|---|---|---|---|
| 6,990,611 B2 * | 1/2006 | Busser | ................ | G06F 11/1076 714/E11.034 |
| 7,024,586 B2 * | 4/2006 | Kleiman | ............. | G06F 11/1662 714/E11.088 |
| 7,055,058 B2 * | 5/2006 | Lee | ..................... | G06F 11/1084 714/6.32 |
| 2008/0151724 A1 * | 6/2008 | Anderson | ........... | G06F 11/1471 369/53.42 |
| 2015/0261443 A1 * | 9/2015 | Wei | ....................... | G06F 3/0683 711/162 |
| 2024/0311033 A1 * | 9/2024 | Subramanian | ........ | G06F 3/0679 |

* cited by examiner

*Primary Examiner* — Charles Ehne
(74) *Attorney, Agent, or Firm* — Fenwick & West LLP

(57) ABSTRACT

A parallel file system (PFS) comprising a plurality of storage nodes. The PFS receives a request to write data in a file from an application running on a client system. The file is stored in a set of storage nodes. The PFS identifies a target storage node to which data needs to be written in response to the request to write data. The PFS detects that the target storage node is inaccessible. The PFS completes the request to write by writing parity data corresponding to the data being written to one or more other storage nodes. The PFS reconstructs the data of the target storage node when the target storage node is accessible.

14 Claims, 7 Drawing Sheets

PROCESSING WRITES WITH STORAGE NODE FAILURE IN A PARALLEL FILE SYSTEM

BACKGROUND

1. Field of the Disclosure

The present disclosure relates to parallel file systems in general and more specifically to handling degradation in writes caused by failure of storage nodes in a parallel file system.

2. Description of the Related Art

High Performance Computing (HPC) systems solve large computational problems by aggregating multiple computing resources. Examples of such computational problems include data-intensive artificial intelligence applications, analytics applications, numerical analysis, and so on. HPC workloads handle large amount of data that keeps increasing as more and more challenging problems are handled. To handle such problems, high performance storage and data management is required. Such high performance storage and data management is often achieved by using parallel file systems that allow several clients to store and access shared data across multiple networked storage nodes by using parallel I/O paths. Parallel file systems may use RAID (redundant array of inexpensive disks) data storage that combines multiple physical disk drive components into logical units for achieving data redundancy and/or performance improvement. Such storage systems are designed to handle failure of storage nodes. However failure of storage nodes degrades performance, for example, file writes to data stored on a storge node that is offline may blocked until the storage node is back online, thereby degrading performance of applications.

SUMMARY

Embodiments relate to a parallel file system comprising a plurality of storage nodes. The PFS stores files comprising stripes, each stripe stored across multiple storage nodes. A client driver running on a client system receives, from an application running on the client system, a request to write data to the file stored on a parallel file system. The file comprises a plurality of stripes. A stripe is stored across storage nodes of the parallel file system. The client driver identifies a stripe of data of the file associated with the request to write data. The stripe is stored across a plurality of storage nodes comprising one or more nodes storing additional data associated with the remaining data of the stripe, for example, additional data that can be used to reconstruct the stripe data such as parity data.

The client driver determines that a target storage node from the plurality of storage nodes is inaccessible. For example, the target storage node may be inaccessible due to failure of a network used by the client system to connect with the target storage node. The request to write data, writes to the target storage node. Responsive to detecting that the target storage node is inaccessible, the client driver, completes the request to write by writing additional data associated with the data being written, for example, parity data corresponding to the data being written to one or more other storage nodes.

If the target storage node is determines to be accessible the data of the target storage node is reconstructed as follows. One or more write requests that were performed when the target storage node was inaccessible are identified. For each of the one or more write requests, the data stored on the target storage node is updated using the additional data derived from the data being written, for example, parity data corresponding to the data being written.

If a read request is received for the file while the target storage node is inaccessible, the read request is executed by reconstructing the data of the inaccessible storage node using the parity data stored on the one or more other storage nodes.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The teachings of the embodiments can be readily understood by considering the following detailed description in conjunction with the accompanying drawings.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

A parallel file system according to an embodiment uses multiple storage nodes and performs parallel and redundant access to data storage nodes to deliver high performance data access with scalability and reliability. However, use of large number of storage nodes increases the likelihood of failure of one or more storage nodes. The PFS according to an embodiment automatically recovers from failures of storage node using network-distributed erasure coding. The PFS continuously balances the data load across the computers. The PFS applies erasure coding by splitting data files into data and parity blocks and encodes it so that the primary data is recoverable even if part of the encoded data is not available. The use of parity data to reconstruct data that was written when a storage node was inaccessible allows writes to proceed even when a storage node is offline, thereby increasing the efficiency of writes to files performed by applications running on client systems that store data using the PFS. The PFS can be used for scientific computing, modeling and simulations, high-performance data analytics, and artificial intelligence/machine learning workloads in industries such as manufacturing, semiconductor design, energy, and so on.

Figure 1:
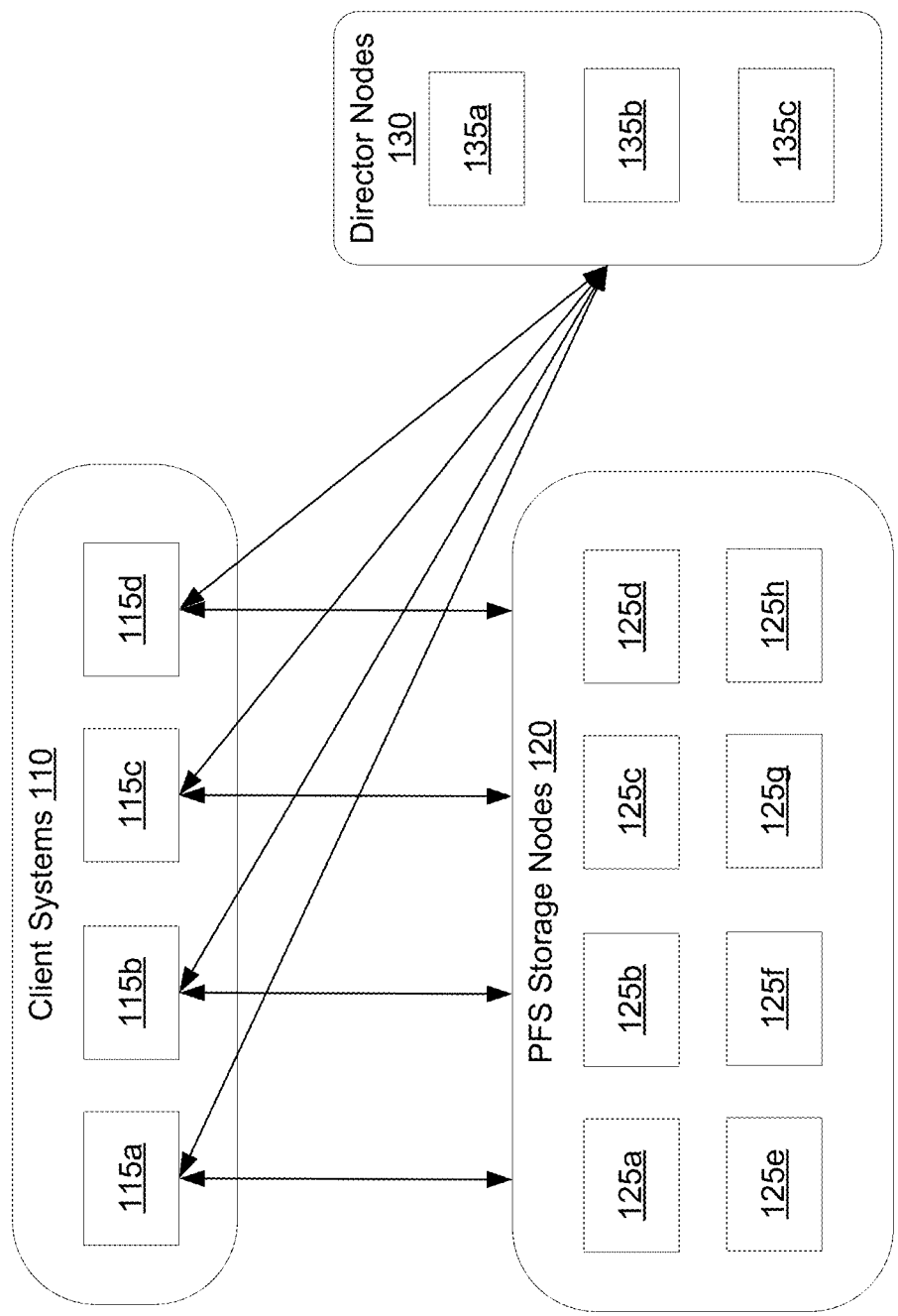
FIG. 1 illustrates the various components in the system environment of a parallel file system, according to an embodiment.

FIG. 1 illustrates the various components in the system environment of a PFS, according to an embodiment. The system environment of the PFS includes a set 110 of client systems 115a, 115b, 115c, 115d, a set 120 or storage nodes 125a, 125b, 125c, 125d, 125e, 125f, 125g, 125h and a set 130 of director nodes 135a, 135b, 135c. The director nodes 135 and storage nodes 125 are computer systems that run the parallel file system. A client system 115 includes a client driver that is a loadable software module that interacts with the director nodes and storage nodes to read and write the files stored by the parallel file system. Any required administration is performed via a graphical user interface (GUI) or call level interface (CLI) running on a director node 135. All the director nodes and storage nodes work together to provide a single file system namespace referred to as a realm.

According to an embodiment, the PFS separates the control plane from the data plane. The director nodes 135 in the PFS form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the PFS storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the PFS form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the PFS is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The PFS scales out both director nodes 135 and storage nodes 125. For any given configuration of the system, additional director nodes can be added for more metadata processing performance. Similarly additional storage nodes can be added for more capacity or more storage performance.

Figure 2:
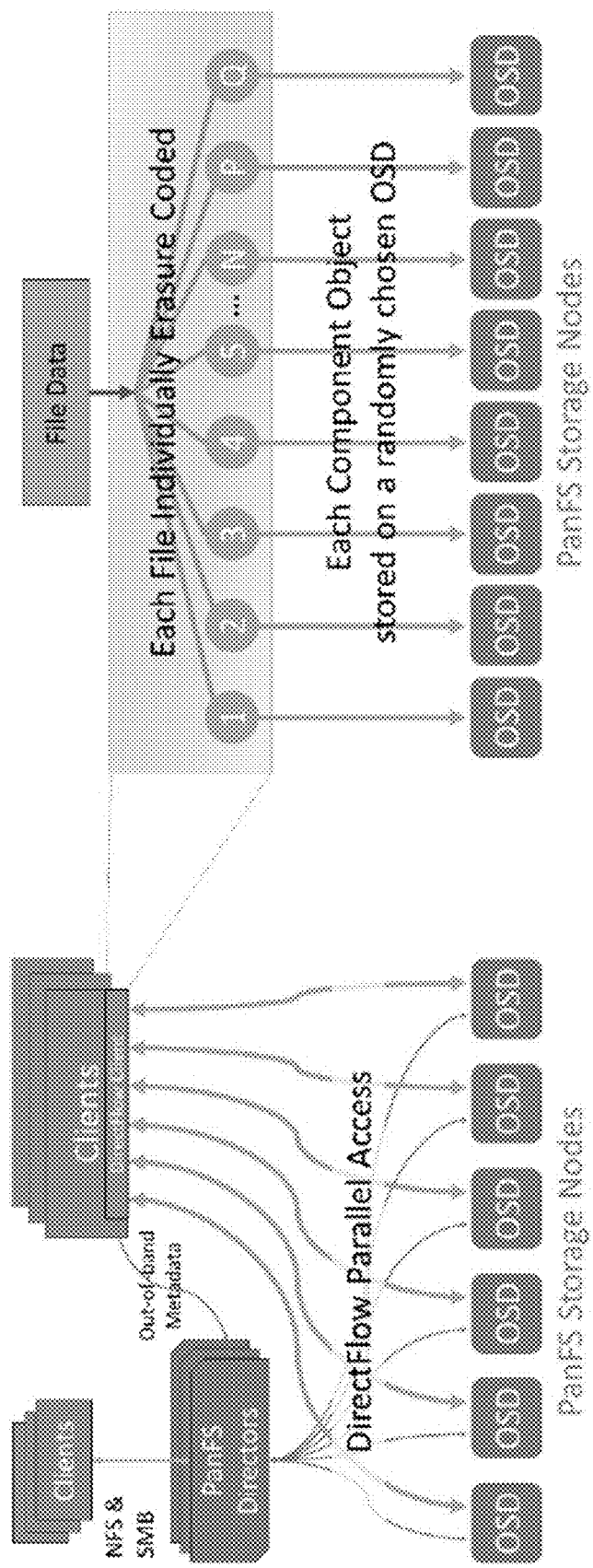
FIG. 2 illustrates how data is stored in a file in the parallel file system, according to an embodiment.

FIG. 2 illustrates how data is stored in a file in the parallel file system, according to an embodiment. The PFS uses multiple storage nodes by assigning a map to each file. The map for a file shows where all the striped component parts of that file are located, and which storage node holds each part. The client driver uses the map to determine which storage nodes to access, directly or in parallel. PFS uses network erasure coding as part of that striping to ensure data integrity and reliability.

The client driver provides the semantics of a locally-mounted, POSIX-compliant file system. The PFS ensures that if a process P2 (possibly on another compute server) is writing to a file at the same time the process P1 is reading from the file, this process P1 will not read stale data. Accordingly, PFS provides cache coherency across all the nodes running the client driver.

PFS performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the PFS provides a consistent system performance.

According to an embodiment, the PFS performs active capacity balancing to maintain consistent system performance. If the system load balance is off by more than a threshold, for example, if many files are deleted at once and a storage node is significantly less utilized compared to others, the director nodes examine utilization of all the storage nodes and transparently move component objects from over-loaded storage nodes to underutilized storage nodes.

Figure 3:
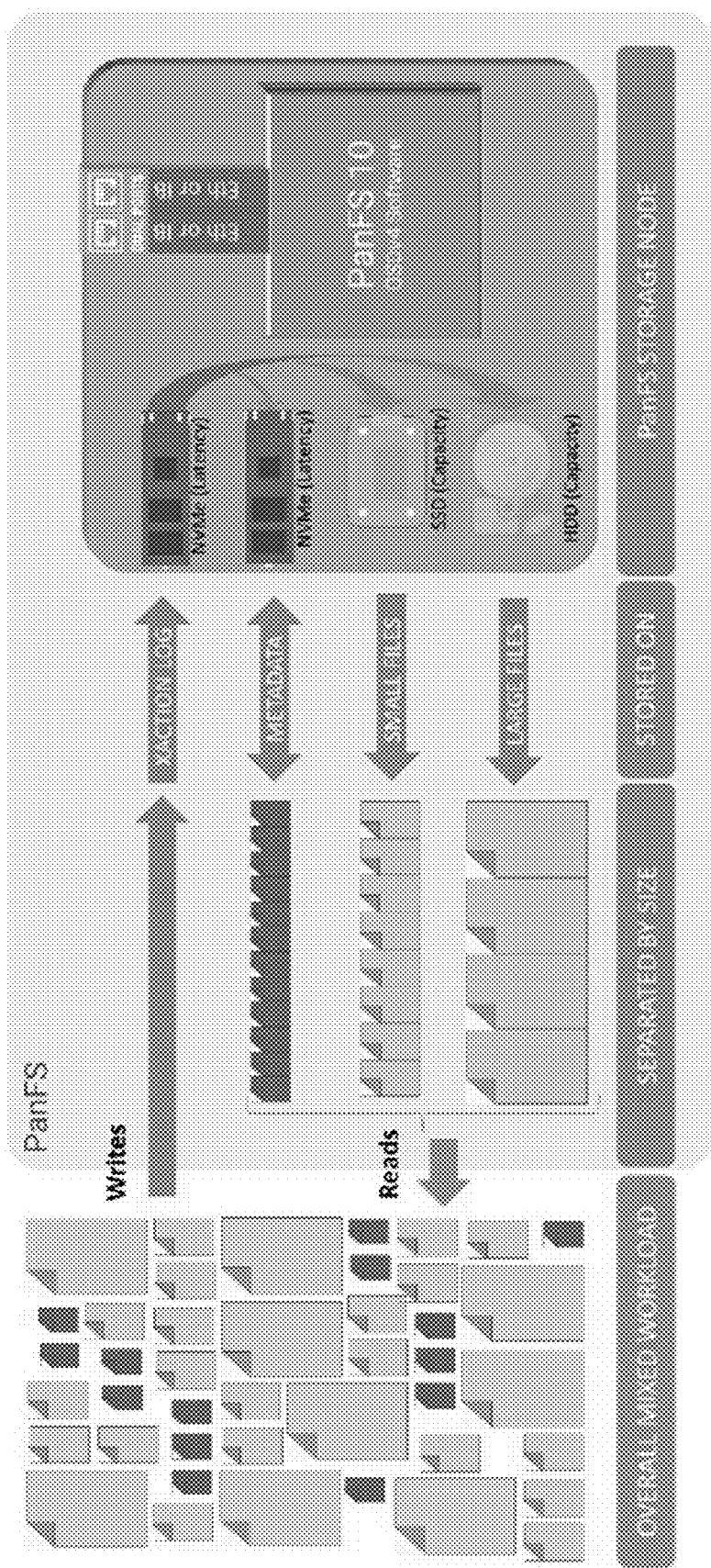
FIG. 3 illustrates the operation of storage nodes of the PFS, according to an embodiment.

FIG. 3 illustrates the operation of storage nodes of the PFS, according to an embodiment. The PFS architecture provides performance and reliability advantages as well as significant performance optimizations using the storage node software to enable efficient use of the available storage media inside each storage node. The PFS storage node handles multiple performance tiers of storage. According to an embodiment, the different performance tiers of a storage node include including storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The PFS takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The PFS tries to keep each SSD full above a threshold level, for example, above 80% full. If an SSD falls below that threshold level, the PFS selects the smallest component objects from the next slowest set of drives and moves them to the SSD until it is about 80% full. If the SSD is too full, PFS moves the largest component objects on the SSD to the next slower tier of drives. Every storage node performs this optimization independently and continuously. A storage node selects component objects to move by looking in its local metadata database.

Storage nodes in the PFS are object storage devices (OSDs). An object stored in an OSD is a Small Computer System Interface (SCSI) object. The PFS can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the PFS supports multiple blade sets in a realm and in the same namespace at the same time.

Figure 4:
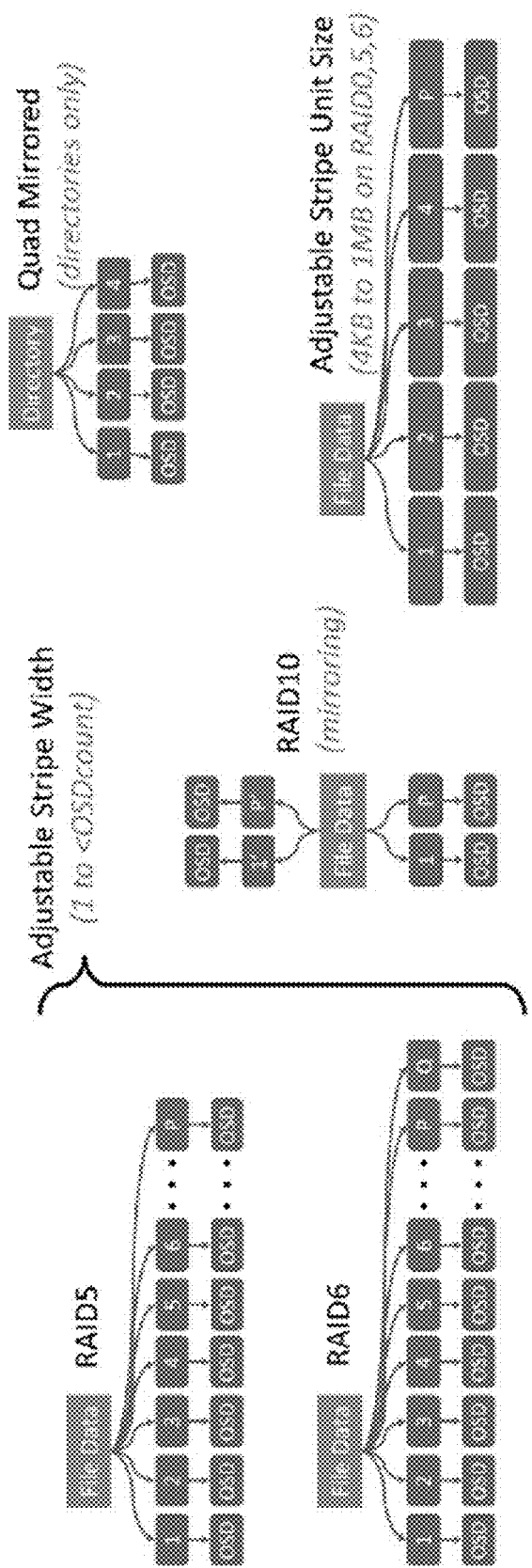
FIG. 4 shows the details of layout of a file stored in the PFS, according to an embodiment.

FIG. 4 shows the details of layout of a file stored in the PFS, according to an embodiment. The PFS stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The PFS stores large POSIX files using erasure coding across multiple component objects, and store small POSIX files using triple-replication across three component objects. This approach delivers higher performance and makes it more space efficient. Unless the first write to a file is a large one, the PFS starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a PFS storage node fails, the PFS reconstructs only those component objects that were on the failed storage node. This is distinct from a RAID array that would reconstruct the entire raw capacity of the storage node. The PFS reads the component objects for each affected file from all the other storage nodes and uses each file's erasure code to reconstruct the component objects that were on the failed node.

When a BladeSet in the PFS is first set up, the PFS sets aside a configurable amount of spare space on all the storage nodes in that BladeSet to hold the output from file reconstructions. When the PFS reconstructs a missing component object, it writes it to the spare space on a randomly chosen storage node in the same BladeSet. As a result, during a reconstruction the PFS uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the PFS protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the PFS maintains a complete directory tree, it can identify the full pathnames of precisely which files need to be restored from a backup or reacquired from their original source, and can therefore also recognize which files were either unaffected or recovered using their erasure coding.

Handling Degradation of Writes in PFS

Conventionally, when a storage node that's part of a RAID group fails, user files that had data shards stored on the failed storage node are damaged. Read access to these files is permitted, but write access is stalled until reconstruction of the damages node is performed by the director nodes. Furthermore, clients are not allowed to write to degraded RAID stripes. The clients must wait for an on-demand director node level process to repair the file. This approach has following limitations: (1) significant delay in getting write access to the damaged files until rebuild starts; (2) once rebuild starts write requests from client nodes must wait for directors to rebuild the files; (3) the file being written must be fully repaired before writes are allowed.

Figure 5:
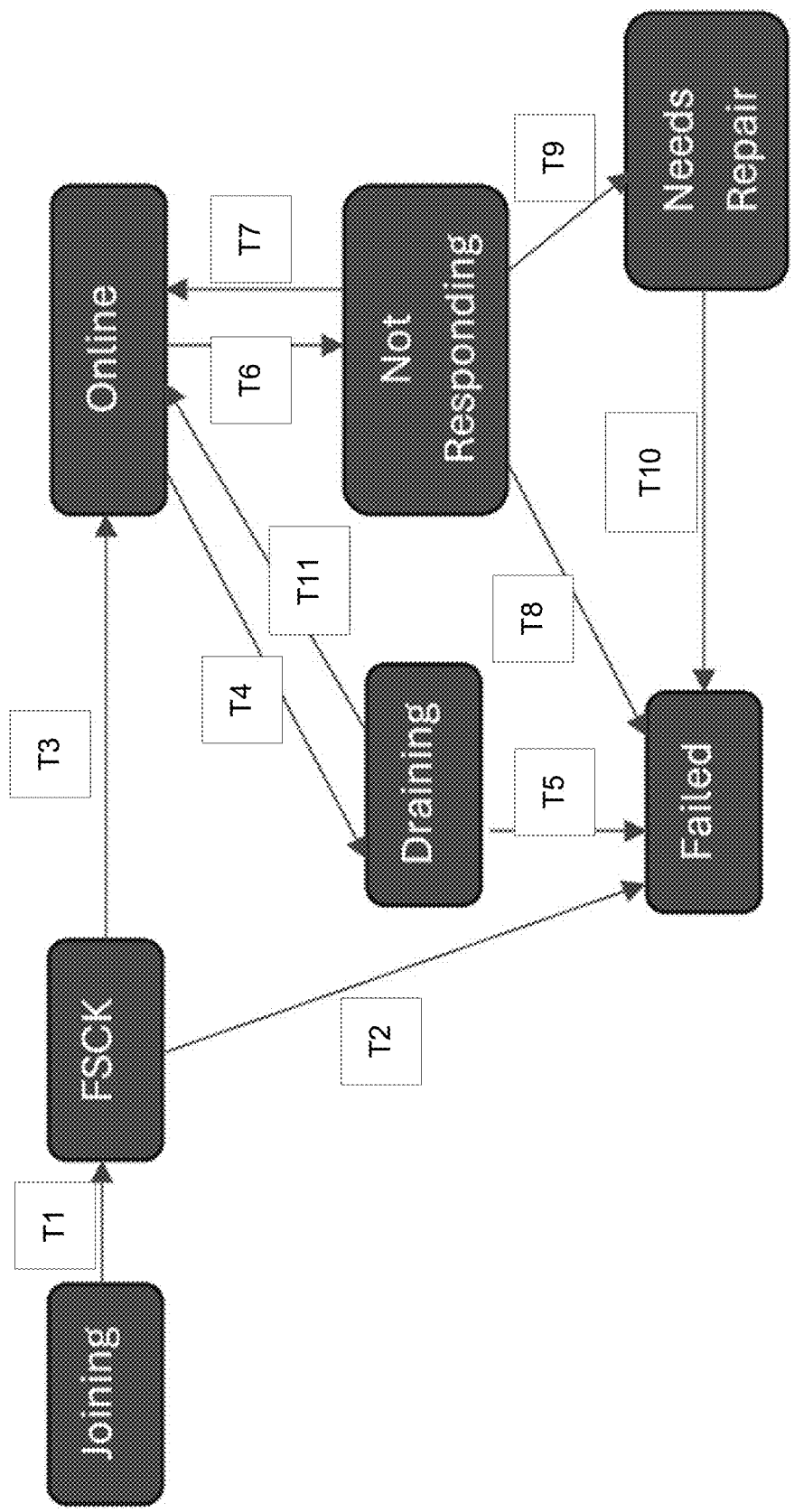
FIG. 5 illustrates a state machine of a storage node of the PFS, according to an embodiment.

FIG. 5 illustrates a state machine of a storage node of the PFS, according to an embodiment. The state transitions of the storage node are as follows. State transition T1 indicates that the storage node obtains an IP (internet protocol) address from a director node and starts file system check (FSCK). State transition T2 indicates that the storage node performs FSCK and fails and state transition T3 indicates that the storage node passed the FSCK. State transition T4 indicates that the a user manually initiated storage node drain process. State transition T5 indicates that the draining of the storage node was completed or was aborted by manually beginning reconstruction. State transition T6 indicates that there was a possible software crash/reboot/network problem. State transition T7 indicates that the storage node recovered and returned to service within timeout period. State transition T8 indicates that the timeout period was reached and the director node(s) automatically started reconstruction. State transition T9 indicates that the storage node failed without flushing data to stable storage and administrator action is needed to initiate reconstruction of storage node. State transition T10 indicates that the reconstruction was manually initiated. State transition T11 indicates that the storage node drain operation was cancelled by administrator.

The system according to an embodiment, uses the director nodes for rebuild process. The director nodes account for the fact that stripe modifications can occur outside of their control. Accordingly, the director nodes coordinate with the client systems to perform the rebuild process. A rebuild process without coordination between the director node and the client systems are likely to run into following issues: (1) a storage node containing a P, Q or D term for a stripe becomes inaccessible (state transition T6); (2) a client writes to that degraded stripe (only data can be written) causing the P, Q or D term on inaccessible node to become inconsistent; (3) storage node recovers by itself (state transition T7); (4) stripe remains inconsistent resulting in potential data integrity problems if ignored.

To resolve these problems the director nodes tracks which degraded files or stripes were written by clients and repairs those later if the node recovers. According to an embodiment, the director node tracks at a file level, thereby requiring requires less metadata storage, but more rebuild work. According to another embodiment, the storage node tracks at stripe-level, thereby minimizing the repair work but using more metadata.

Figure 6:
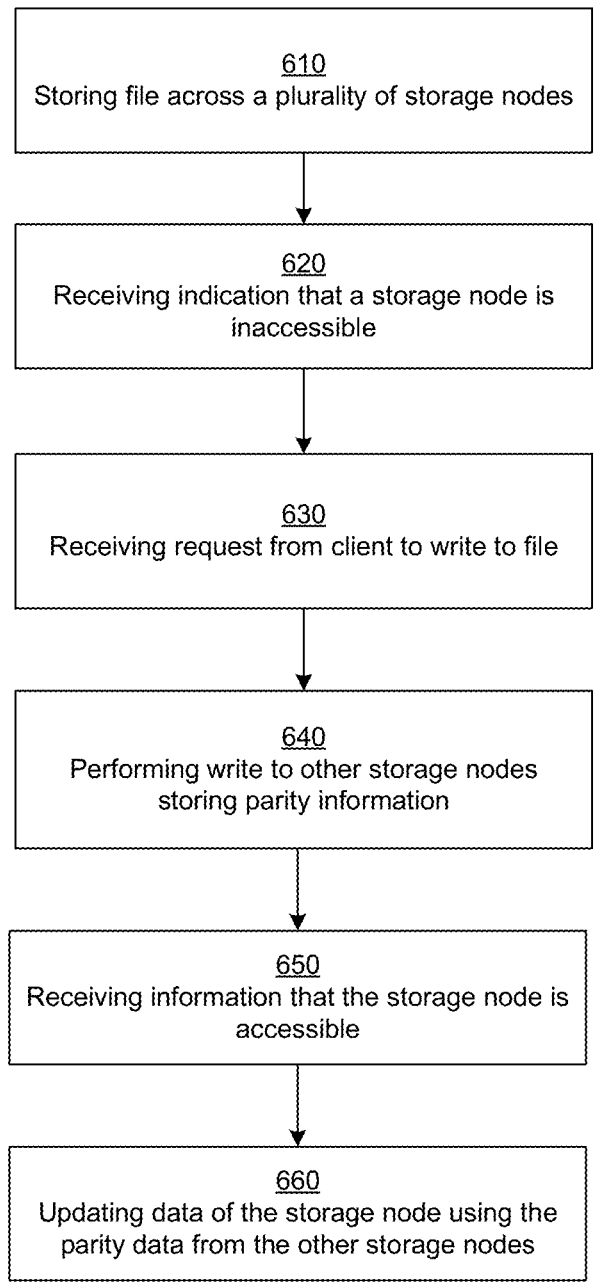
FIG. 6 is a flowchart illustrating the process of processing a write request to the PFS, according to an embodiment.
Figure 7:
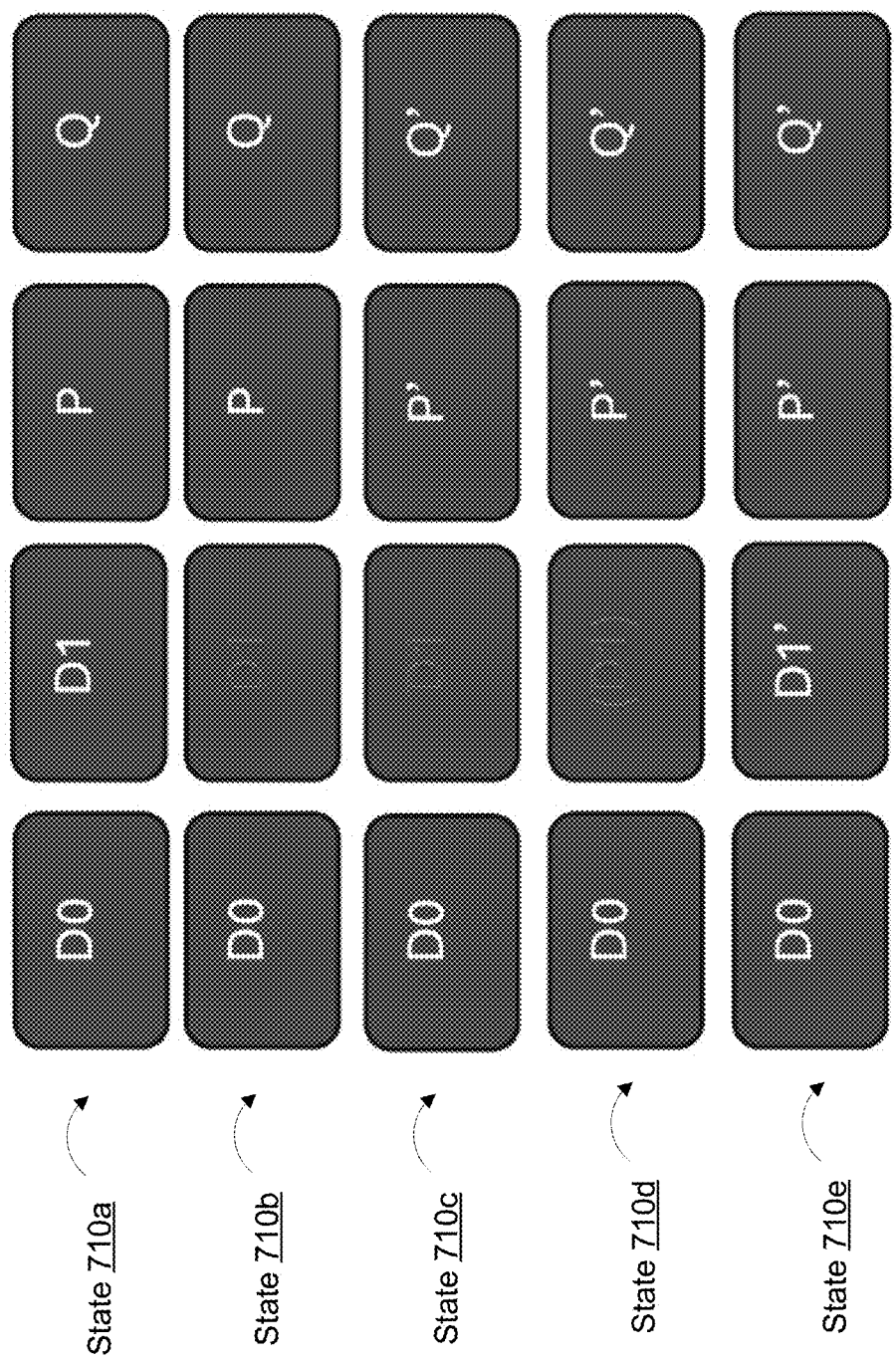
FIG. 7 illustrates the state of various storage nodes of the PFS storing a stripe while processing the write request as illustrated in FIG. 6, according to an embodiment.

FIG. 6 is a flowchart illustrating the process of processing a write request to the PFS, according to an embodiment. The steps are performed by various modules of the parallel file system, for example, the client driver. FIG. 7 illustrates the state of various storage nodes of the PFS storing a stripe while processing the write request as illustrated in FIG. 6, according to an embodiment. The steps of the process illustrated in FIG. 6 are described in connection with the example shown in FIG. 7.

The PFS stores each file across a plurality of storage nodes. The file comprises one or more stripes. A stripe is stored across a plurality of storage nodes of the PFS. The PFS stores parity data corresponding to data stored in a storage node on other storage nodes. The parity data can be used to reconstruct the data stored in a storage node. State 710a of the PFS shown in FIG. 7 shows various storage nodes storing data of a stripe including D0, D1, P, and Q. The data P and Q represent parity data corresponding to the data D1.

The PFS, e.g., the client driver of a client system receives a request to write data in a file from an application running on the client system. The client driver identifies a storage node of a stripe where the data needs to be written in response to the request. As shown in FIG. 7, the write request updates the data D1.

If the storage nodes identified for writing the data in response to the request are accessible, the PFS completes the write operation successfully. In some situations, a storage node of the PFS may not be accessible, for example, due to network failure or hardware issues. The client driver detects that a target storage node to which data needs to be written is inaccessible. As shown in FIG. 7, the storage node storing data D1 is determined to be inaccessible.

If the client driver detects that the target storage node is inaccessible, the client driver completes execution of the request to write by determining parity data corresponding to the data being written and sending the parity data to one or more other storage nodes. As shown in FIG. 7, even though the data D1 is not updated, the PFS updates the parity data P and Q to P' and Q' respectively so that P' and Q' are consistent with the updated data corresponding to D1. Accordingly, in spite of the storage node being inaccessible, the PFS completes the write operation and sends an indication to the application that the write was completed successfully. Note that the client driver may not actually determine that the write actually occurred, the client driver uses the request as an indication that the write likely will occur, and treats it as if it did.

However, a director node (or one or more director nodes) tracks information describing the write requests that were processed when the target storage node was inaccessible. The director node reconstructs the data of the target storage node from the parity data stored on other storage nodes when the target storage node is accessible. The target storage node storing data D1 may recover by itself, for example, if the target storage node was inaccessible because of a transient connectivity issue that may fix itself after some time. Since the director node tracks all writes that occurrent during the period that the target storage node was inaccessible, the director node determines that the data D1 stored in the target storage node is stale or outdated. Accordingly, if the director node detects that the target storage node is accessible, the director node identifies all the write requests that were performed when the target storage node was inaccessible and for each of the identified write requests, the director node updates the data stored on the target storage node using the parity data corresponding to the data being written. As shown in state 710e of FIG. 7, the data D1 of the target storage node is updated to data D1 based on the parity data P' and Q'.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:
receiving, by a client driver running on a client system, from an application running on the client system, a request to write data to a file stored on a parallel file system, the file comprising a plurality of stripes, wherein a stripe is stored across storage nodes of the parallel file system;
identifying, by the client driver, a stripe of data of the file associated with the request to write data, the stripe stored across a plurality of storage nodes;
determining, by the client driver, that a target storage node from the plurality of storage nodes is inaccessible, wherein the request to write data writes a first data to the target storage node;
responsive to detecting that the target storage node is inaccessible, completing, by the client driver, the request to write by storing parity data in one or more other storage nodes without storing the first data;
responsive to receiving a read request for the first data while the target storage node is inaccessible, reconstructing the first data from the parity data stored on the one or more other storage nodes and returning the first data reconstructed from the parity data;
determining that the target storage node is accessible; and
responsive to determining that the target storage node is accessible, rebuilding data of the target storage node by a director node, wherein the director node communicates with the client driver for rebuilding the data of the target storage node by:
identifying by the director node by communicating with the client driver, one or more write requests that were performed when the target storage node was inaccessible, and
for each of the one or more write requests, updating the data stored on the target storage node using the parity data stored in one or more other storage nodes.

2. The computer-implemented method of claim 1, wherein the target storage node is inaccessible due to failure of a network used by the client system to connect with the target storage node.

3. The computer-implemented method of claim 1, further comprising:
recording for the file, information identifying the request to write executed when the target storage node was inaccessible, wherein the information recorded for the file is used to identify the one or more write requests that were performed when the target storage node was inaccessible.

4. The computer-implemented method of claim 1, wherein the parallel file system comprises one or more director nodes storing metadata describing files stored in the parallel file system.

5. The computer-implemented method of claim 4, wherein reconstructing the data of the target storage node when the target storage node is accessible is performed by a director node.

6. A non-transitory computer readable storage medium storing instructions that when executed by one or more computer processors, cause the one or more computer processors to perform steps comprising:
receiving, by a client driver running on a client system, from an application running on the client system, a request to write data to a file stored on a parallel file system, the file comprising a plurality of stripes, wherein a stripe is stored across storage nodes of the parallel file system;
identifying, by the client driver, a stripe of data of the file associated with the request to write data, the stripe stored across a plurality of storage nodes;
determining, by the client driver, that a target storage node from the plurality of storage nodes is inaccessible, wherein the request to write data writes a first data to the target storage node;
responsive to detecting that the target storage node is inaccessible, completing, by the client driver, the request to write by storing parity data in one or more other storage nodes without storing the first data;
responsive to receiving a read request for the first data while the target storage node is inaccessible, reconstructing the first data from the parity data stored on the one or more other storage nodes and returning the first data reconstructed from the parity data;
determining that the target storage node is accessible; and
responsive to determining that the target storage node is accessible, rebuilding data of the target storage node by a director node, wherein the director node communicates with the client driver for rebuilding the data of the target storage node by:
identifying by the director node by communicating with the client driver, one or more write requests that were performed when the target storage node was inaccessible, and
for each of the one or more write requests, updating the data stored on the target storage node using the parity data stored in one or more other storage nodes.

7. The non-transitory computer readable storage medium of claim 6, wherein the target storage node is inaccessible due to failure of a network used by the client system to connect with the target storage node.

8. The non-transitory computer readable storage medium of claim 7, further comprising:
recording for the file, information identifying the request to write executed when the target storage node was inaccessible, wherein the information recorded for the file is used to identify the one or more write requests that were performed when the target storage node was inaccessible.

9. The non-transitory computer readable storage medium of claim 6, wherein the parallel file system comprises one or more director nodes storing metadata describing files stored in the parallel file system.

10. The non-transitory computer readable storage medium of claim 9, wherein reconstructing the data of the target storage node when the target storage node is accessible is performed by a director node.

11. A computer system comprising:
one or more computer processors; and
a non-transitory computer readable storage medium storing instructions that when executed by the one or more computer processors, cause the one or more computer processors to perform steps comprising:
receiving, by a client driver running on a client system, from an application running on the client system, a request to write data to a file stored on a parallel file system, the file comprising a plurality of stripes, wherein a stripe is stored across storage nodes of the parallel file system;

identifying, by the client driver, a stripe of data of the file associated with the request to write data, the stripe stored across a plurality of storage nodes;

determining, by the client driver, that a target storage node from the plurality of storage nodes is inaccessible, wherein the request to write data writes a first data to the target storage node;

responsive to detecting that the target storage node is inaccessible, completing, by the client driver, the request to write by storing parity data in one or more other storage nodes without storing the first data;

responsive to receiving a read request for the first data while the target storage node is inaccessible, reconstructing the first data from the parity data stored on the one or more other storage nodes and returning the first data reconstructed from the parity data;

determining that the target storage node is accessible; and responsive to determining that the target storage node is accessible, rebuilding data of the target storage node by a director node, wherein the director node communicates with the client driver for rebuilding the data of the target storage node by:

identifying by the director node by communicating with the client driver, one or more write requests that were performed when the target storage node was inaccessible, and for each of the one or more write requests, updating the data stored on the target storage node using the parity data stored in one or more other storage nodes.

12. The computer system of claim 11, wherein the target storage node is inaccessible due to failure of a network used by the client system to connect with the target storage node.

13. The computer system of claim 12, further comprising: recording for the file, information identifying the request to write executed when the target storage node was inaccessible, wherein the information recorded for the file is used to identify the one or more write requests that were performed when the target storage node was inaccessible.

14. The computer system of claim 11, wherein the parallel file system comprises one or more director nodes storing metadata describing files stored in the parallel file system, wherein reconstructing the data of the target storage node when the target storage node is accessible is performed by a director node.

* * * * *